July 8, 1930.  A. DIEZMANN  1,770,228

BEARING ADJUSTING MEANS

Filed Oct. 9, 1929

Inventor
A. Diezmann
by

Patented July 8, 1930

1,770,228

UNITED STATES PATENT OFFICE

ARNO DIEZMANN, OF ERLAU, GERMANY

BEARING-ADJUSTING MEANS

Application filed October 9, 1929, Serial No. 398,542, and in Germany February 22, 1928.

The object of the present invention is to provide means for accurately adjusting the bearing surfaces of roller bearings, whereby to take up wear.

The invention also comprehends improvements in the details of construction and arrangement of parts to be hereinafter described and pointed out in the claim.

1 indicates a shaft having mounted thereon gears $1^a$ for transmitting motion to or from said shaft. Secured on the shaft 1 between the gears and a collar $1^b$, are two bearing rings 9 and 10, and between same is a spacing ring 11. The parts thus far described are clamped on the shaft against the collar $1^b$ by a clamping device indicated at 2.

Figure 1:
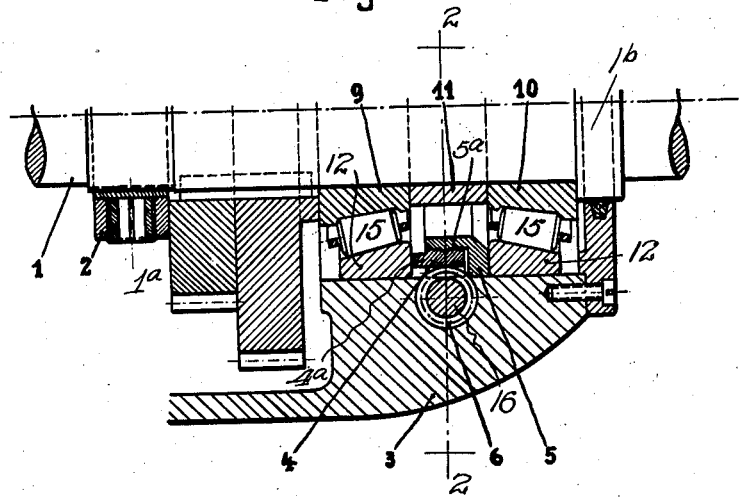
Fig. 1 illustrates a detail cross section of the improved bearing adjusting mechanism on the line 1—1 of Fig. 2.
Figure 2:
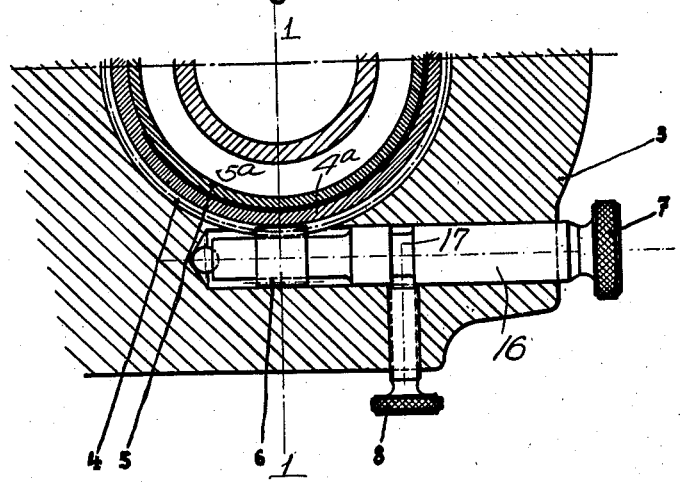
Fig. 2 is a similar detail section on the line 2—2 of Fig. 1.

The peripheries of the two bearing rings 9 and 10 are inclined toward each other to form bearing surfaces for anti-friction rollers 15. These rollers bear on the peripheries of outer bearing rings 12—12 which incline in opposite directions as clearly shown in Fig. 1. The outer bearing rings fit within a housing 3 and are adapted to be adjustable toward and away from each other by means now to be described.

In the space formed between the bearing rings 9, 10 and 12, is an inner adjusting ring 5, formed at one end with a flange which abuts against the bearing ring 12. The inner adjusting ring 5 is provided with fine threads, indicated at $5^a$ which intermesh with similar threads $4^a$ on an outer adjusting ring 4. One edge of the outer adjusting ring 4 abuts against the adjacent outer bearing ring 12, while on the periphery of said outer adjusting ring is formed a worm gear $4^b$. Mounted in the housing 3 is a transverse shaft 16, on which is mounted a worm 6, which engages the worm gear. The outer end of the shaft is provided with a knurled head 7, and said shaft is further provided with an annular recess 17, which receives a screw 8, threaded in the housing for holding the shaft 16 in operative relation.

When the parts are assembled as shown in the drawing, and it is desired to take up wear of the bearings, the shaft 16 is rotated and through the intermeshing of the worm and worm gear, the outer adjusting ring 4 is rotated. Through the screw threads $4^a$ and $5^a$ between the inner adjusting ring 4 and outer adjusting ring 5, when the outer adjusting ring 4 is rotated, the two adjusting rings 4 and 5 are moved in opposite directions to impinge against and consequently adjust the two outer bearing rings 12—12 and thus take up any wear.

What I claim is:

In combination, a bearing comprising two sets of spaced apart inner and outer bearing rings and rollers interposed between said bearing rings, inner and outer adjusting rings having fine threaded engagement one with the other, said adjusting rings being mounted intermediate the respective outer bearing rings of the bearing, the outer adjusting ring having a projection to bear against one of the outer bearing rings, the inner adjusting ring having a flange extension to overlie the edge of the outer adjusting ring and bear against the other outer bearing ring, the outer surface of the outer adjusting ring being formed with a worm gear and being otherwise free of connection with the parts of the bearing, a transverse shaft mounted for rotation in a fixed part of the bearing and accessible from beyond the end of the bearing, and a worm on the transverse shaft to engage the worm gear on the outer adjusting ring whereby through the fine threaded connection between the adjusting rings said rings are moved relative to each other in the movement of the outer adjusting ring incident to the operation of said shaft.

Leipzig, Germany, signed the 25th day of September, 1929.

ARNO DIEZMANN.